(12) United States Patent
Le Pennec et al.

(10) Patent No.: US 6,963,585 B1
(45) Date of Patent: Nov. 8, 2005

(54) METHOD AND SYSTEM FOR ESTABLISHING A VIRTUAL PATH CAPABILITY IN A FRAME RELAY NETWORK

(75) Inventors: Jean Francois Le Pennec, Nice (FR); Guy Euget, Vence (FR)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 09/690,207

(22) Filed: Oct. 17, 2000

(30) Foreign Application Priority Data

Oct. 21, 1999 (EP) .................................. 99480112

(51) Int. Cl.[7] .............................................. H04J 3/16
(52) U.S. Cl. ...................................... 370/468; 370/399
(58) Field of Search ............................... 370/236, 389, 370/399, 409, 426, 466, 351, 400, 401, 522, 370/902, 904, 395.1, 395.2, 410, 216, 397, 370/468, 395.21–395.5

(56) References Cited

U.S. PATENT DOCUMENTS

| | | | |
|---|---|---|---|
| 5,999,524 A | 12/1999 | Corbalis et al. | |
| 6,041,166 A | 3/2000 | Hart et al. | |
| 6,052,726 A | 4/2000 | Fontenot | |
| 6,125,119 A * | 9/2000 | Cherukuri et al. | 370/410 |
| 6,222,844 B1 * | 4/2001 | Han et al. | 370/397 |
| 6,366,580 B1 * | 4/2002 | Bradley et al. | 370/395.2 |
| 6,526,063 B1 * | 2/2003 | St-Amand et al. | 370/395.5 |
| 6,538,988 B1 * | 3/2003 | Natarajan et al. | 370/216 |
| 6,636,512 B1 * | 10/2003 | Lorrain et al. | 370/392 |
| 6,714,544 B1 * | 3/2004 | Bosloy et al. | 370/395.1 |

* cited by examiner

*Primary Examiner*—Phirin Sam
*Assistant Examiner*—Robert W Wilson
(74) *Attorney, Agent, or Firm*—John R. Pivnichny; Dillon & Yudell LLP

(57) ABSTRACT

A method and system for establishing a Virtual Path (VP12) capability in a Frame Relay network wherein frames are transmitted over a plurality of virtual circuits from a first switching node to a second switching node. A control message is transmitter from the first switching node to the second switching node with a Data Link Connection Identifier (DLCI) having a predetermined value indicating the purpose of the control message which is to define a virtual path aggregating at least two virtual circuits selected from multiple virtual circuits. The control message contains the identification of the virtual circuits aggregated in the defined virtual path.

14 Claims, 4 Drawing Sheets

METHOD AND SYSTEM FOR ESTABLISHING A VIRTUAL PATH CAPABILITY IN A FRAME RELAY NETWORK

BACKGROUND OF THE INVENTION

1. Technical Field

The present invention relates in general to packet switching network communications and, in particular, to frame relay networks. Still more particularly, the present invention relates to methods for establishing a virtual path capability in a frame relay network.

2. Description of the Related Art

Frame relay networks provide high speed virtual private network (VPN) capable of point-to-point high speed data transmission. Frame relay systems delimit and align frames on a channel using flags identifying the beginning and ending of a frame. Frame relay systems typically support virtual circuit multiplexing and demultiplexing through the use of a Data Link Connection Identifier (DLCI) in the frame. A DLCI identifies a virtual connection on a channel at a user to network or network to network interface. Consequently, A DLCI specifies a data link layer entity to which information is delivered or received from. A DCLI is specified in a particular field in each frame in the data link layer. The DLCI field may be either unstructured or structured.

FIG. 1 shows a diagram of a particular network for illustrating concepts of prior art as well as the present invention. A source user 10 sends a message over a prior art system to a destination user at address 64.2.3.4. A router 10 which receives the traffic to this destination, references an internal routing table, determines that this address is mapped with DLCI 27. Router 12 then puts the contents of the message in a frame and sets the DCLI field to DLCI 27 before sending this frame over the Frame Relay network. The frame is received by a first switching node which then consults its internal routing table to determine that the frame is to be mapped to DLCI 992. After performing the mapping, first switching node 16 relays the frame to a second switching node 18 which maps the frame to DLCI 35 and then sends the frame to router 20 which forwards the frame to the destination user at address 64.2.3.4.

As described above, DLCIs are pre-mapped to a particular destination. A routing table within each switching node specifies the proper output port for each DLCI frame. A unique DLCI is required to establish each of a plurality of virtual circuits which utilize a single switching node even though each of the plurality of virtual circuits connect to a single switching node over a common trunk. The DLCI field in each frame typically has only 10 bits and most of the possible bit combinations are reserved or used to convey specific user information. As a result there is a limited supply of unique DLCIs available. Furthermore, connectionless operations could be established within a network if the requirement is met that each frame arrives at the correct port designated by the destination identifier.

SUMMARY OF THE INVENTION

All objects, features, and advantages of the present invention will become apparent in the following detailed written description.

An the object of the present invention is to achieve a method which enables a plurality of virtual circuits which utilize a single trunk between two switching nodes of a Frame Relay network to use a single common Data Link Connection Identifier (DLCI). Another object of the invention is to achieve a protocol enabling several virtual circuits using the same trunk between two switching nodes of a frame relay network to be aggregated in a single virtual path.

A method is disclosed for establishing a Virtual Path (VP) capacity in a Frame Relay network whereby frames are transmitted over a select plurality of virtual circuits from a first switching node to a second switching node. A first switching node transmits to a second switching node a control message with a Data Link Connection Identifier (DLCI) having a predetermined value. This control message defines a virtual path aggregate in which two or more virtual circuits from among a plurality of virtual circuits are combined and identifies the individual virtual circuits which are combined to form the virtual path.

According to one aspect of the invention, the control message includes a particular field (VCID) containing one byte for identifying each virtual circuit which is combined to form the virtual path. The control message also includes: a field for specifying a source Virtual Circuit IDentifier (SV-CID) which corresponds to the input network adapter used by the virtual circuit in the first switching node; a field for a Source Port IDentifier (SPID), which corresponds to the input port used by the virtual circuit in the first switching node; a Destination Virtual Circuit IDentifier (DVCID) field corresponding to the output adapter used by the virtual circuit in the second switching node; and a Destination Port IDentifier (DPID) field corresponding to the output port used by the virtual circuit in the second switching node.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
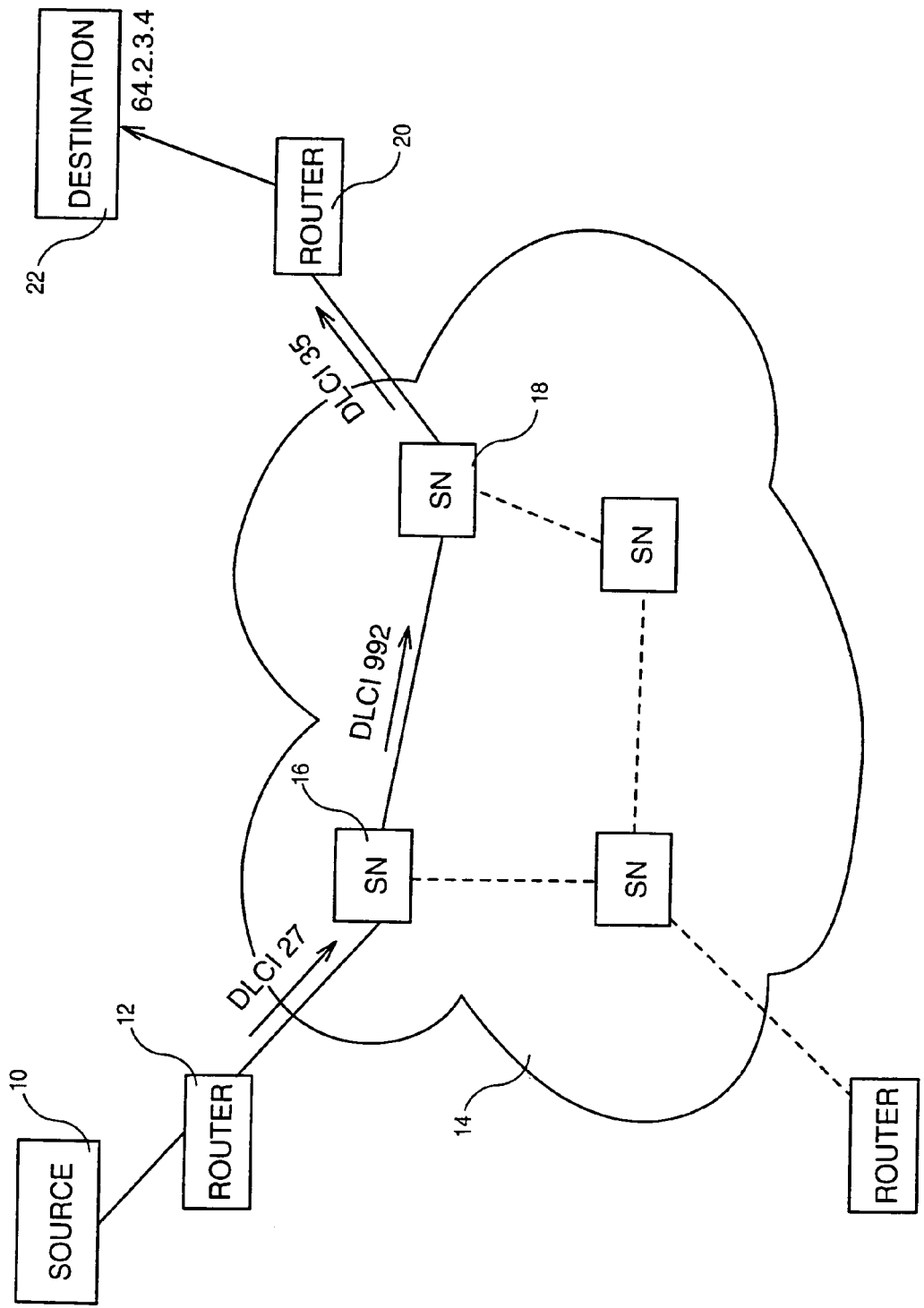
FIG. 1 depicts an illustrative embodiment of a Frame Relay network in which the methods and systems of the present invention may advantageously be utilized.

With reference now to the figures and in particular with reference to FIG. 1, there is a virtual connection established between switching node 16 and switching node 18 using a Data Link Connection Identifier (DLCI)992. In this embodiment, several virtual circuits are established through switching node 16 and switching 18 (or between two other switching nodes of Frame Relay network 14).

Figure 2:
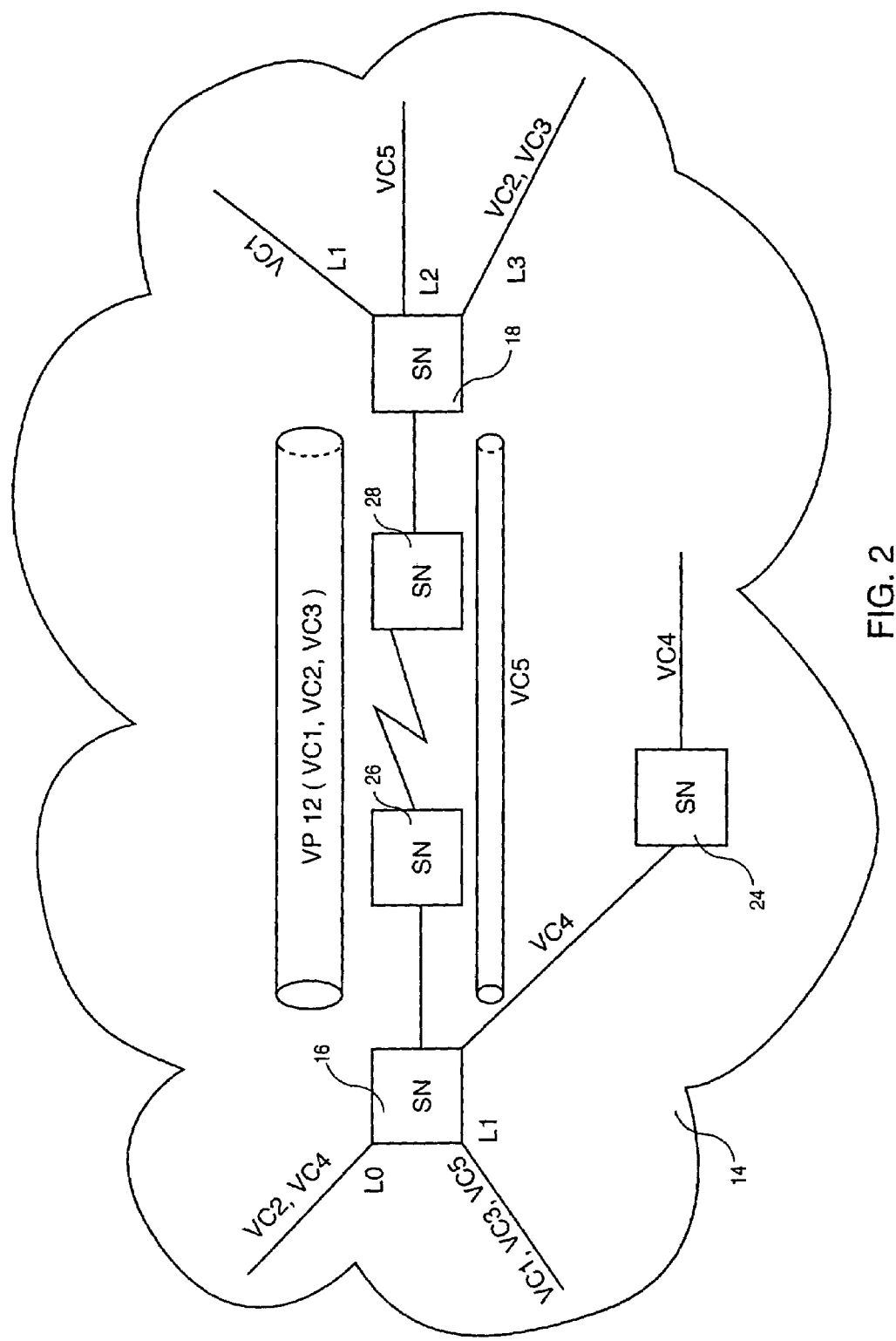
FIG. 2 depicts a block-diagram of a Frame Relay network having several virtual circuits established between a first switching node and a second switching node which are combined using the methods of the present invention to form a virtual path aggregate.

Referring now to FIG. 2 which illustrates an embodiment of the present invention. Switching node 16 is linked to external network elements through virtual circuits VC2, VC4 on a link L0 and VC1, VC3 and VC5 on another link L1. Switching node 18 is connected to virtual circuit VC1 on link L2, virtual circuit VC5 on link L3 and virtual circuits VC2, VC3 on link L4. The inputting switching node 16 to virtual circuit VC5 connects with another switching node 24. External links may be network ports but may be also trunks connected to other nodes of network 14.

Switching node 16 connects to a backbone node switching node 26, which connects to another backbone switching node 18. Switching node 18 connects to switching node 28. A virtual path 12 is established according to the methods of the invention, which is a combination of common portions of virtual circuits VC1, VC2, VC3 that reside between switching nodes 16 and 18. In this embodiment, virtual circuit VC5 which corresponds to a class of service different from the class of service of virtual circuits VC1, VC2, and VC3, is not included in virtual path 12 to illustrate the coexistence of standard virtual circuits with virtual paths according to the invention. In this embodiment, the virtual path 12, which is implemented between two switching nodes 16 and 18 includes intermediary switching nodes 26 and 28. However, a virtual path 12 of the present invention may be implemented between two adjacent nodes as well.

Figure 3:
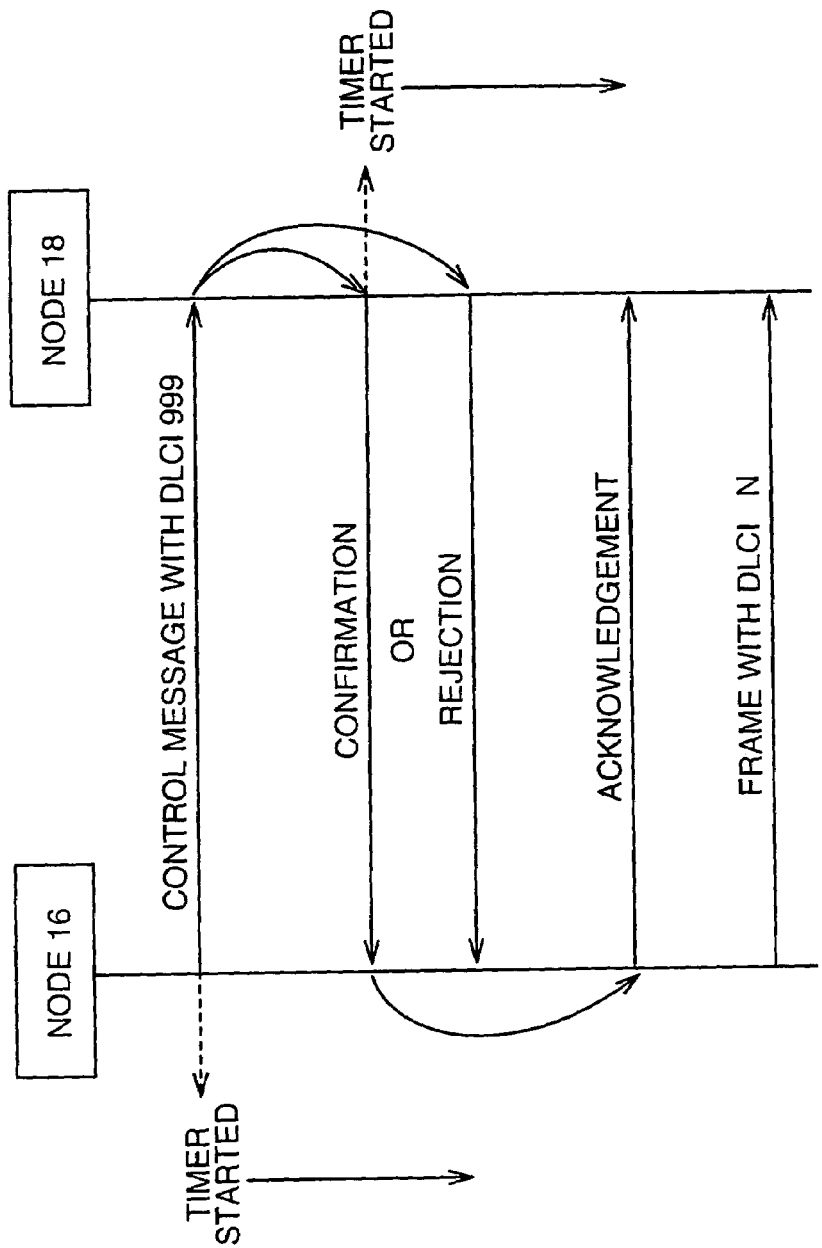
FIG. 3 is a diagram for illustrating a hand shake protocol exchanged between the two switching nodes of FIG. 2 for establishing a virtual path aggregate which utilizes the methods of the invention.

The assignment of virtual circuits to a new virtual path is configured within both switching nodes 16 and 18, while the intermediary switching nodes remain transparent. An embodiment of a protocol is defined, in accordance with he methods of the present invention, to support the data exchange and the negotiation between the two nodes for configuring the nodes to comprehend the new virtual path aggregate. This embodiment is illustrated in FIG. 3.

A control message is sent from switching node 16 to switching node 18 to request the configuration of a new virtual path. To indicate the purpose of this message, the DLCI field is set to predefined value 999, which is one of the values which are reserved for layer management of the frame bearer service. Node 18, receives this control message, determines from the DLCI value of 999 that the purpose of the message is to establish a virtual path, and then records the chain of VCs assigned to this new virtual path aggregate identified by the DLCIn.

Node 18 answers the request from node 16 by sending a control message either acknowledging affirmatively or rejecting the request to establish a virtual path. Affirmative acknowledgment is sent if the virtual circuits are operational and the quality of service requested in the line with the authorized parameters. A rejection is sent if the VCs are not operational in an aggregation mode. In the preferred embodiment, status information is included in the rejection message for identifying the reason for the rejection, which is forwarded to the network management system for filing and analysis. If no answer from node 18 is received by node 16 then node 18 may not have understand the request. A timer is used within node 16 to detect this error, which may also be forwarded to the network management system for filing and analysis.

If a rejection message or no answer is received by switching node 16, then the virtual path is not formed and error information is forwarded to the network management system for filing and analysis.

If an acknowledge message is received by node 16 from node 18 and no other condition occurred which prevents forming the virtual, then node 16 responds by sending node 18 a message affirming the virtual path aggregate. Otherwise, depending on the message received by node 16, a message is sent by node 16 to node 18 either indicating the error or acknowledging the rejection from node 18. Node 18 may also use a timer to detect the absence of a response from node 16 and then generate an error condition communicating the absence of a response to system management.

Figures 4, 5, 6A, 6B:
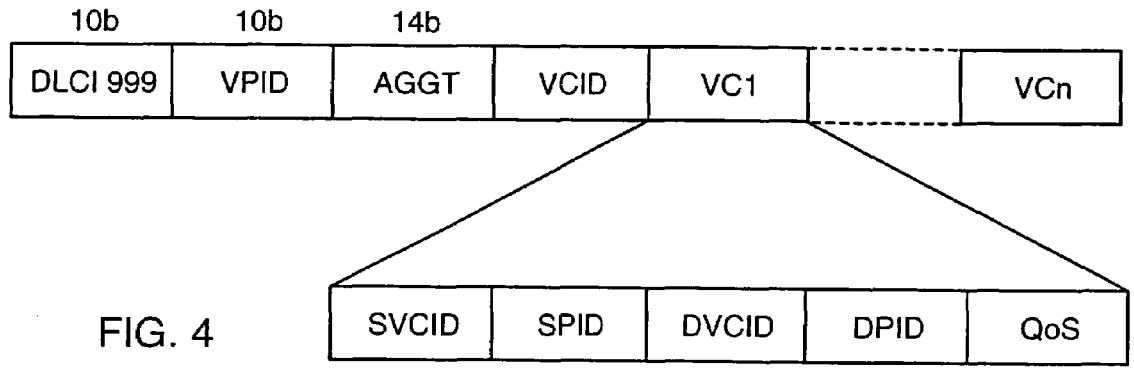
FIG. 4 is the format of a control message utilized by an embodiment of the present invention, which is sent from a first switching node to a second switching node.
FIG. 5 shows a format of a data frame, utilized by an embodiment of the present invention, in which a virtual path between the two switching nodes is established.
FIGS. 6A and 6B represent, respectively, a source table and a destination table of an switching node which are updated by a control message according to the methods of the invention.

FIG. 4 illustrates an embodiment, which is in accordance with the present invention, of a format for a control message sent from a first switching node to second switching node to initiate the configuration of a virtual path. This control message has a defined data structure and uses a specific value for DLCI (in this case DLCI set to 999) which is predefined, through network or inter-node protocol, to indicate a negotiation for configuring a virtual path between the two nodes. A specific DLCI may be assigned for each logical connection between two nodes of the network where a virtual path aggregate is needed. In the disclosed embodiment, each field of the control message, shown in FIG. 4, is defined as follows in table 1.

TABLE 1

| FIELD NAME | BITS WITHIN FIELD | FIELD DEFINITION |
| --- | --- | --- |
| VPID | | The Trunk Virtual Path Identifier |
| AGGT | | Aggregation type 14 bits (0–13) |
| | 0, 1 | Defines nb of bytes used for merging VC filed in data frame (1, 2 or 3 bytes) corresponds to the size of the VCID2, 3: number of bytes for Source Port definition (6, 14, 22 or 30 bits) |
| | 4, 5 | Number of bytes for Destination Port definition (6, 14, 22 or 30 bits) |
| | 6, 7 | Defines the size of the QoS Field: 0, 1, 2 or 3 bytes (Flow ID + QoS) |
| | 8 to 12 | Indicates whether the message is a single command or multiple commands and if multiple, then the number of VCs included |
| | 13 | Spare bit |
| VCID | | Trunk VC identifier |

This control message, may be used to set up one virtual path aggregate and one or more VCs, which have portions that are combined to form a new virtual path. Preferably, whenever one or more new VCs are established between the two nodes, a control message is sent to include the new VC(s) in the virtual path. For this reason, a control message need never contain many VC identifications.

In each control message, of the disclosed embodiment, the field after DLCI 999 of 10 bits contains the Virtual Path IDentifier (VPID) which identifies the common DLCI N for transmitting the frames belonging to all aggregated VCs between the two nodes.

The AGGT field of 14 bits specifies the aggregation type and mode corresponding to the aggregated VCs listed after this field. The AGGT filed allows alignment of the boundary of the VCs definition to an exact number of bytes.

The Virtual Circuit IDentification, specified in the VCID field, contains as many bytes as there are VCs to be combined. For each VC, the fields, which follow the VCID field, define the Source Virtual Circuit IDentifier (corresponding to the input adapter of switching node 16), the Source Port IDentifier (corresponding to the input port switching node 16), the Destination Virtual Circuit IDentifier (corresponding to the output adapter of switching node 18), the Destination Port Identifier (corresponding to the output port of switching node 18) and the QoS field which defines Priority, Queue, Traffic type, Flow ID (per VC).

FIG. 5 shows an embodiment of a structure for a data frame according to the methods of the present invention. The header is the VP identification which fits into the DLCI field. The VC identification of the VC number i, that is VCID(i) is put the first byte of the data field which is ended by the Frame Check Sequence (FCS) field. The control message, sent to request configuration of a virtual path, as shown in reference to FIG. 4, informs the receiving switching node which port and on which VC this data frame is to be mapped.

Each time a control message is sent between the two switching nodes, each node updates its internal identification table, such as those shown in FIGS. 6A and 6B. For the sending node, the source table maps, for each coupled VP/VC respectively identified by VPID and VCID, to the Source VC identifier and the Source Port Identifier. Similarly, for the receiving node, the destination table maps for each coupled VP/VC, to the Destination VC identifier and Destination Port identifier.

Each time a frame is received on an input adapter in switching node 16, the node's internal source table is consulted to determine whether this frame is to be encapsulated into a VP structure of the present invention or transmitted as a normal VC frame. Similarly, the receive adapter of switching node 18, consults an internal table to determine whether this frame is a normal VC frame which will be mapped using the classical forwarding mechanism or is a VP encapsulated frame of the present invention which will be forwarded to the port specified by the defined VC given by the line pointed by this frame's VP/VC identifier.

Note that any virtual circuit which is no longer used should be deleted from a virtual path. For this purpose a supplementary field in the control message, such as the VCID field, is reserved in the disclosed embodiment. Alternatively, the first switching node may utilize a time counter for detecting extended periods of non-activity by each VC which triggers the first switching node to remove the inactive VC from the VP. In this case, The source table is overwritten in the first switching node. An internode protocol message from the first switching node to the second switching node is sent to remove the inactive VC from the destination table.

The preferred embodiment enables some VCs or the entire VP to be canceled by a particular predefined control message in which bit 13 of the AGGT field (See table 1) is set to 1. In this case, if all the VCID fields following the AGGT field have all their bits set to 0, this indicates that the entire VP is to be removed. Only some VCID fields may have all their bits set to 0 to indicate that only these VCs are to be removed from the VP. This method provides for an efficient re-configuration.

While the invention has been particularly shown and described with reference to a preferred embodiment, it will be understood by those skilled in the art that various changes in form and detail may be made therein without departing from the spirit and scope of the invention.

What is claimed is:

1. A method for establishing a virtual path within a frame relay network wherein frames are transmitted over a plurality of virtual circuits from a first switching node to a second switching node, said methods comprising:

transmitting by said first switching node to said second switching node, a first control message transmitting information specifying a virtual path to be established, and specifying two or more virtual circuits to be combined to form said virtual path, said information comprising:

a source virtual circuit identifier, which corresponds to an input adapter of said first switching node;

a source port identifier, which corresponds to an input port of said first switching node;

a destination virtual circuit identifier, which corresponds to an output adapter of said second switching node; and a destination port identifier, which corresponds to an output port of said second switching node;

receiving a frame, at said second switching node, wherein said frame has an identifier corresponding to said virtual path;

forwarding said frame, utilizing said second switching node, to a destination determined based on said two or more said virtual circuits specified in said first control message;

transmitting to said second switching node, a fourth control message, sent by said first switching network, for removing one of said two or more virtual circuits from said virtual path, wherein said transmitting to said second switching node further includes:

starting a plurality of activities timers, wherein each of said two or more virtual circuits combined to form said virtual path corresponds to one of said activities timers;

resetting, for each frame received for said two or more virtual circuits combined to form said virtual path, the corresponding activity-timer;

detecting, by the expiration of one of said activity-timers, an extended period of non-activity by one of said virtual circuits which correspond to said expired activity-timer; and transmitting to said second switching node said fourth control message, sent by said first switching network for removing from said virtual path, said virtual circuit corresponding to said expired activity-timer.

2. The methods of claim 1, wherein said step of transmitting said first control message includes the step Of handling a data link connection identifier, corresponding to a predetermined value, for identifying said purpose of first control message.

3. The method of claim 1, wherein said step of transmitting said first control message includes the step Of transmitting a field for identifying each of said two or more said virtual circuits.

4. The method of claim 1, further comprising the step of:

transmitting by said second switching node to said first switching node, a second control message conveying acknowledgment of said request to establish said virtual path or rejection of said request to establish said virtual path.

5. The method of claim 4, further comprising the step of:
transmitting to said first switching node to said second switching node, a third control message acknowledging a reception of said second control message by said ist switching node.

6. The method of claim 1, further comprising the step of:
starting a timeout timer, by said first switching node, when said first control message is transmitted;
detecting an error when said timeout timer expires prior to receiving a second control message from said second switching node, wherein said second control message conveys acknowledgment of said request to establish said virtual path or rejection of said request to establish said virtual path.

7. The method of claim 1, further comprising the step of:
transmitting to said second switching, a fifth control message, sent by said first switching network, for canceling said virtual path.

8. A system for establishing a virtual path with a frame relay, said system comprising:
a frame relay network including a plurality of virtual circuits for transmitting frames from a first switching node to a second switching node;
a virtual path established by a first control message transmitted by said first switching node to said second switching node, defining a virtual path, and specifying two or more virtual circuits to be combined to form said virtual path, said first control message specifying:
a source virtual circuit identifier, which corresponds to the input adapter of said first switching node;
a source port identifier, which corresponds to the input port of said first switching node;
a destination virtual circuit identifier, which corresponds to the output adapter of said second switching node; and
a destination port identifier, which corresponds to the output port of said second switching node;
a frame, having an identifier corresponding to said defined virtual path, received by said second switching node and then forward said frame to a destination determined by said two or more virtual circuits specified in said control message; and
a plurality of activities timers, wherein one said activities timers corresponds to each of said two or more virtual circuits combined to form said virtual path, wherein for each fame received for said two or more virtual circuits combined to form said virtual path, said corresponding said activity-timer is reset;
an error condition signal, wherein said error condition signal is generated from the detection by the expiration of one of said activity-timers, an extended period of non-activity by one of said virtual circuits which correspond to said expired activity-timer; and
a fourth control message, sent by said first switching network in response to said error condition signal, for removing from said virtual path, said virtual circuit corresponding to said expired activity-timer.

9. The system of claim 8, wherein said control message includes a data link connection identifier, corresponding to a predetermined value, for identifying said purpose of first control message.

10. The system of claim 8, wherein said control message includes a field for identifying each of said two or more virtual circuits.

11. The system of claim 8, further comprising:
a second control message transmitted by said second switching node to said first switching node, conveying acknowledgment of said request to establish said virtual path or rejection of said request to establish said virtual path.

12. The system of claim 11, wherein said first switching node is adapted to transmit in response to said second control message, to said second switching node a third control message acknowledging a reception of said second control message by said first switching node.

13. The system of claim 8, further comprising:
a timeout timer, set by said first switching node when said first control message is transmitted;
detecting an error when said timeout timer expires prior to receiving a second control message from said second switching node, wherein said second control message conveys acknowledgment of said request to establish said virtual path or rejection of said request to establish said virtual path.

14. The method of claim 8, wherein said first switching node is adapted to transmit to said second switching, a fifth control message, for canceling said virtual path.

* * * * *

UNITED STATES PATENT AND TRADEMARK OFFICE
CERTIFICATE OF CORRECTION

| | |
|---|---|
| PATENT NO. | : 6,963,585 B1 |
| APPLICATION NO. | : 09/690207 |
| DATED | : November 8, 2005 |
| INVENTOR(S) | : Le Pennec et al. |

It is certified that error appears in the above-identified patent and that said Letters Patent is hereby corrected as shown below:

In Claim 5, at column 7, line 7, delete "ist" and insert --first--.

Signed and Sealed this

Twenty-second Day of August, 2006

JON W. DUDAS
*Director of the United States Patent and Trademark Office*